(No Model.) 2 Sheets—Sheet 1.

N. B. FASSETT.
MACHINE FOR COUPLING DRIVE CHAIN LINKS.

No. 524,964. Patented Aug. 21, 1894.

Witnesses:
Chas. P. Taylord,
Luto J. Alter

Inventor:
Nelson B. Fassett.
By Banning & Banning & Payson,
Attys.

(No Model.) 2 Sheets—Sheet 2.
N. B. FASSETT.
MACHINE FOR COUPLING DRIVE CHAIN LINKS.

No. 524,964. Patented Aug. 21, 1894.

Witnesses:
Chas. E. Gaylord
Lute G. Filter

Inventor.
Nelson B. Fassett.
By Banning & Banning & Payson,
Attys.

THE NORRIS PETERS CO., PHOTO-LITHO., WASHINGTON, D. C.

UNITED STATES PATENT OFFICE.

NELSON B. FASSETT, OF CHICAGO, ILLINOIS.

MACHINE FOR COUPLING DRIVE-CHAIN LINKS.

SPECIFICATION forming part of Letters Patent No. 524,964, dated August 21, 1894.

Application filed April 14, 1893. Serial No. 470,388. (No model.)

*To all whom it may concern:*

Be it known that I, NELSON B. FASSETT, a citizen of the United States, residing at Chicago, Illinois, have invented certain new and useful Improvements in Machines for Coupling Drive-Chain Links, of which the following is a specification.

This invention has for its object the construction of a machine for coupling or uniting together the separate links of detachable drive chains, which shall be much cheaper of construction and more simple and direct in its operation than any of those now in use.

Figure 1:
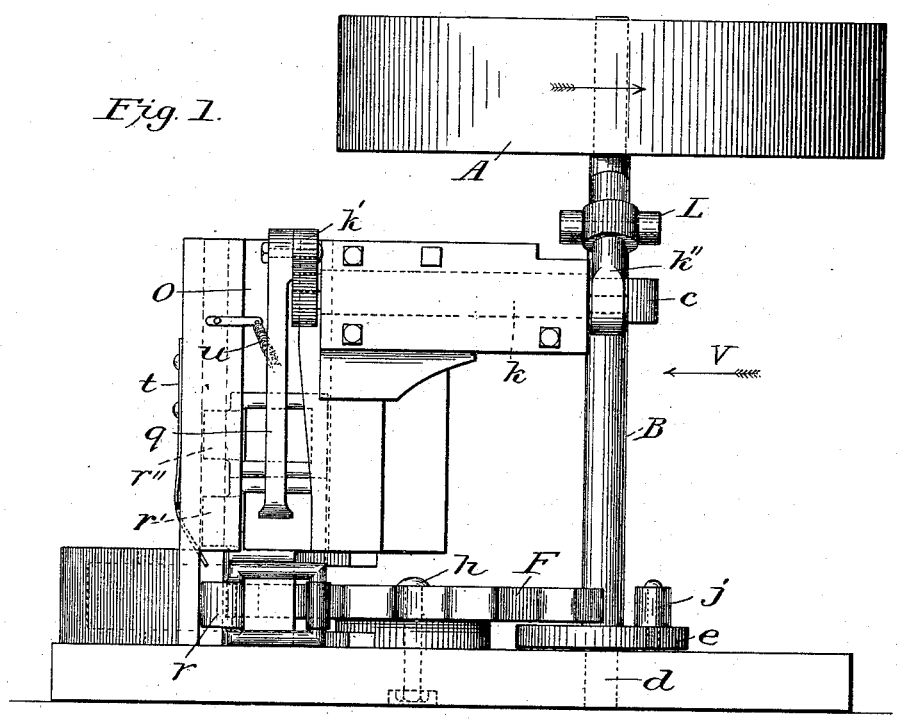
Figure 2:
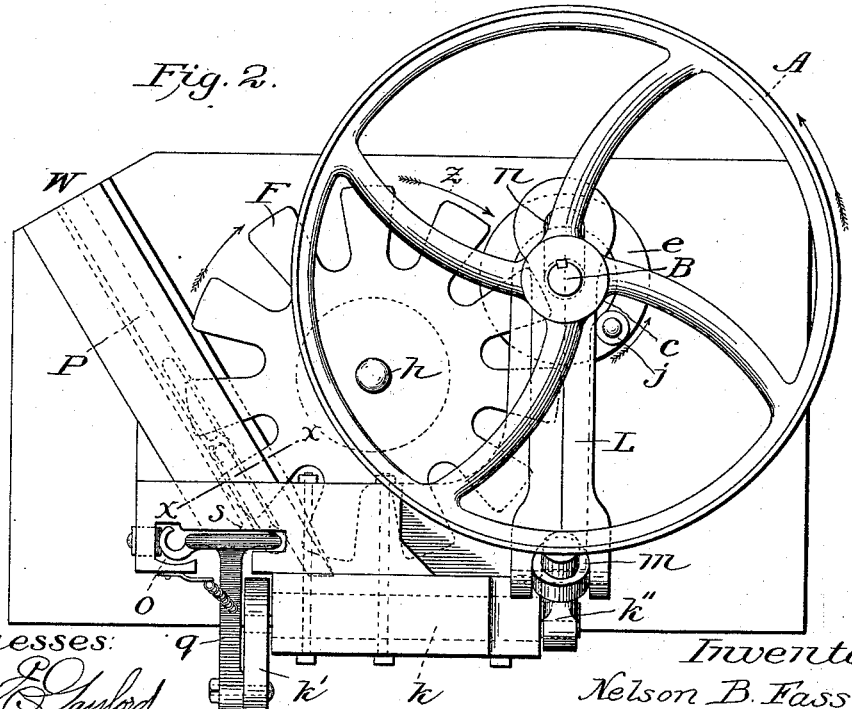
Figure 3:
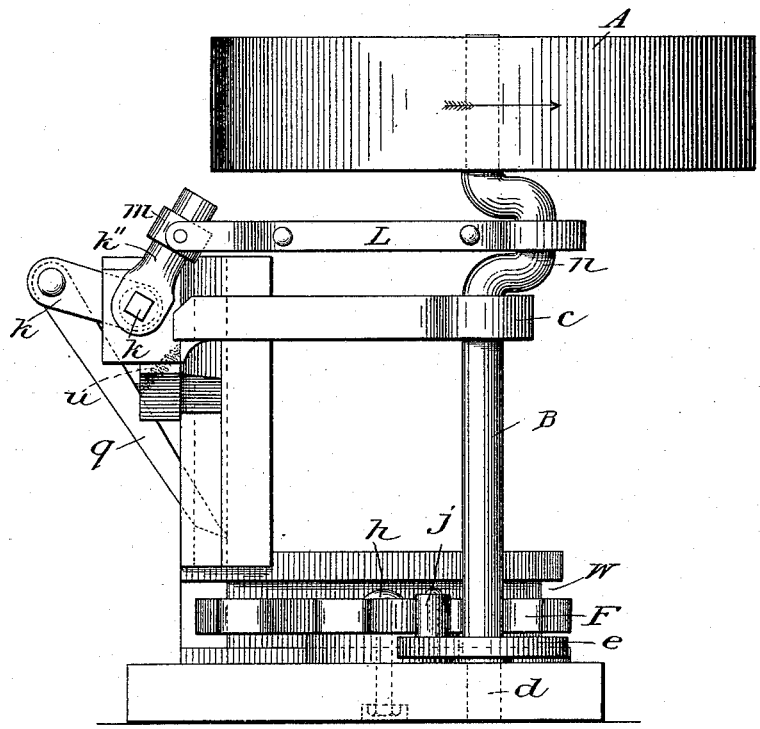
Figure 4:
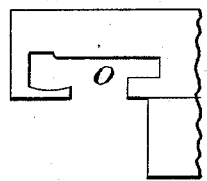
Figure 5:
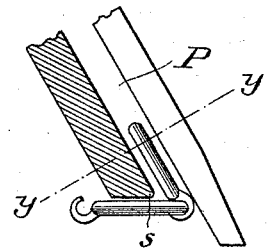
Figure 6:
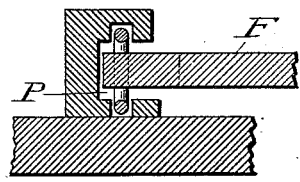

In the drawings, Figure 1 is a front elevation of a machine embodying my invention. Fig. 2 is a plan view of the same. Fig. 3 is a side elevation of the same, viewed in the direction indicated by the arrow V, in Fig. 1. Fig. 4 is a top view looking endwise downwardly into the link channel, as represented in Fig. 2. Fig. 5 is a plan of the chain links and their relation to the chain channel. Fig. 6 is a partial view of a section taken in the line $y, y,$ of Fig. 5, or in the line $x, x,$ of Fig. 2.

At the present time there are to my knowledge but two kinds of machines for coupling or uniting the cast links of drive chains so as to form the completed chain. In both of these the link channel is arranged at an incline and the links pass down endwise. In one, the chain channel is arranged directly under the link channel and in the other the link channel is arranged at one side of it, so that the links are bodily moved sidewise. In both, however, the links move on their sides and endwise, and in neither of them do they move edgewise. In my present machine, however, the link channel is preferably arranged in a vertical position, the links move down it edgewise, the chain channel is arranged so that the links move along it on their edges, the last link in the chain channel is moved so that its hook is under the edge of the link channel, which contains the end bars of the links, the chain channel is located in the same plane as the end bars of the uncoupled links, is at right angles to the longitudinal plane of the link channel and at an acute angle to the transverse plane of the same. It is thought, however, that these and other differences between my present machine and those which have been heretofore used, will be fully understood from a study of the drawings and the detailed description of my invention.

In the specification, A indicates the driving wheel; B the main shaft, journaled at $c$ and $d$.

F, is a sprocket wheel pivoted at $h$.

$j$ is a friction roller by which the sprocket wheel is rotated.

$k$ is a double crank shaft having an oscillating crank, $k'$ at one end, and a thimble coupling crank, $k''$, at the other.

L is a connecting bar connecting the thimble, $m$, with the crank $n$ of the main shaft B.

O and P are link and chain channels, respectively.

$q$ is the link coupler or link coupling bar.

$r$ is a chain link occupying the lowermost link space in the link channel.

$r'$ is the first link above it, and the one which is to be next pushed downward into coupling with the hook of the lower link $r$ after the latter has been drawn around the fulcrum corner into the chain channel by the sprocket wheel F.

$s$ is the fulcrum corner above mentioned.

$t$ in Fig. 1 is a spring arm attached at its upper end to the link channel standard, and is curved inwardly through it at its lower end,—its purpose being to press against the hook end of the link so as to prevent that end from any tendency to drop down by its own weight, and thus cause a possible cramping of the plain end bar in the hook link with which it is being coupled.

$u$ is a coiled spring to keep the lower end of the link coupler $q$ always drawn toward the link channel, so that on its downward thrust it will engage with the lower side bar of the second link $r'$ up in the link channel, and cause the coupling of it with the last link in the chain channel.

The hook of the last link subserves the purpose of a link guide for the plain end bar of the interlocking link on its downward passage, the interior hook and the plain end bars of the links above it being in the same vertical line. It will be seen also that the chain channel is set up edgewise and partially under the link channel, that is, under that portion of the link channel which contains the plain end bars of the loose links, and that the chain channel is horizontal and the link channel vertical, and that the plain end bar of each link is always parallel with the link channel. The links are coupled together while one of them is yet lying wholly within the link channel, and is never pushed sidewise from it, but always thrust endwise of the link channel to interlock with the link setting up edgewise in the chain channel to receive it; the link coupler being arranged above or over the link channel and moving endwise of it, the links being themselves thrust in the direction of their cross bars longitudinally through the hooks of the link with which they are being coupled. While this machine is therefore an endwise coupling machine, the coupling of links that go together sidewise is effected.

The sprocket wheel F is made with wide sprockets, so as to nearly or quite fill lengthwise the central opening of the links. The stud or friction roller $j$ is made fast to the crank wheel $e$, and is carried around by the driving shaft B. At each revolution of this shaft the roller $j$ enters successively the space between the sprockets, and causes the wheel F to advance in the direction of the arrow $z$ a distance between two sprockets, or the length of one link of the chain, as shown. By this simple arrangement of the wheel F, crank wheel $e$ and roller $j$, the assembled chain is carried along intermittently in the chain channel as new links are added, and by the timely movements of the crank $n$, connecting bar L, rocks the shaft $k$, with its two cranks and the link coupler $q$, the separate links are separately and automatically assembled into a chain.

The separate links are fed, as will be seen, into the link channel at its upper edge, as shown in Fig. 1. Each link is, one after the other, forced downwardly in the link channel by the link coupler into coupling with the last link in the chain channel, and all are carried along together, and are discharged out of the machine through the chain channel at W, as shown in Fig. 2.

What I regard as new, and desire to secure by Letters Patent, is—

1. In a machine for coupling chain links, the combination of a feed-chute adapted to receive uncoupled links, a guide-way adapted to receive coupled links when in an edgewise position, and located in the same plane as the end bars of the uncoupled links in the feed-chute, and means for advancing the coupled links along the guide way substantially as described.

2. In a machine for coupling chain links, the combination of a feed-chute adapted to receive uncoupled links, and a guide-way in a plane at right angles to the longitudinal plane of the feed-chute adapted to receive coupled links when in an edgewise position, the interior of the hook of the last coupled link in the guide-way being directly under the end bar of the next uncoupled link in the feed-chute, and means for advancing the coupled links along the guide way substantially as described.

3. In a machine for coupling chain links, the combination of a feed-chute adapted to receive uncoupled links, a guide-way in a plane at right angles to the longitudinal plane of the feed-chute and at an acute angle to the transverse plane of the feed-chute and adapted to receive coupled links when in an edgewise position, and means for advancing the coupled links along the guide way substantially as described.

4. In a machine for coupling chain links, the combination of a feed-chute adapted to receive uncoupled links, a fulcrum corner, a guide-way adapted to receive coupled links when in an edgewise position, and located in the same plane as the end bars of the uncoupled links in the feed-chute, and means for advancing the coupled links along the guide way substantially as described.

5. In a machine for coupling chain links, the combination of a feed-chute adapted to receive uncoupled links, a guide-way adapted to receive coupled links when in an edgewise position, and located in the same plane as the end bars of the uncoupled links in the feed-chute, and means for intermittently advancing the coupled links in the guide-way, substantially as described.

NELSON B. FASSETT.

Attest:
A. R. BASSLER,
AUG. C. LANDIS.